United States Patent [19]

Chen

[11] 4,388,436

[45] Jun. 14, 1983

[54] PERMEABLE CONTACT LENS

[75] Inventor: Richard Chen, Phoenix, Ariz.

[73] Assignee: National Patent Development Co., New York, N.Y.

[21] Appl. No.: 271,481

[22] Filed: Jun. 8, 1981

[51] Int. Cl.³ .......................... C08F 20/54; G02C 7/04
[52] U.S. Cl. ................................. 524/553; 204/159.22; 351/160 R; 351/160 H; 526/307.7
[58] Field of Search .................. 526/307.7, 309, 303.1; 260/29.6 R, 29.6 T; 204/159.22; 351/160 R, 160 H; 524/553

[56] References Cited

U.S. PATENT DOCUMENTS 3,983,083  9/1976  Kaetsu et al. ........................ 526/309
4,107,418  8/1978  Yatsu et al. ....................... 526/307.7

Primary Examiner—Harry Wong, Jr.
Attorney, Agent, or Firm—Cushman, Darby & Cushman

[57] ABSTRACT

A hydrophilic soft contact lens is made from a crosslinked copolymer of an N,N-($C_1$-$C_2$alkyl)acrylamide and cyclohexyl methacrylate. The lens has much higher oxygen permeability and better mechanical properties than conventional hydrophilic contact lenses.

26 Claims, No Drawings

PERMEABLE CONTACT LENS

BACKGROUND OF THE INVENTION

Hydrophilic copolymers have been used in the past to make soft contact lens, e.g., see Wichterle Reissue Pat. No. 27,401 which shows, for example, the use of a sparingly cross-linked copolymer of a hydrophilic monoester of acrylic or methacrylic acid and dihydric alcohol with a minor amount of diester of a dihydric alcohol and acrylic or methacrylic acid.

More recently, it has been proposed to make a hydrophilic lens from a cross-linked copolymer of an N,N-($C_1$-$C_2$ alkyl)acrylamide and a $C_1$-$C_4$alkyl acrylate or methacrylate, see Schultz U.S. Pat. No. 4,067,839. The entire disclosures of Schultz and Wichterle are hereby incorporated by reference and relied upon.

SUMMARY OF THE INVENTION

It has now been found that improved hydrophilic soft contact lenses can be made from a cross-linked copolymer of an N,N-($C_1$-$C_2$alkyl)acrylamide, e.g., N,N-dimethylacrylamide or N,N-diethylacrylamide and cyclohexyl methacrylate. The dry or nearly dry cross-linked copolymer in the form of discs or so-called buttons can be readily machined and polished with conventional equipment to a contact lens blank. After several washing and equilibration steps in water or physiologic saline, the resulting hydrated (soft) lens is maintained in osmotic equilibrium in the saline. The soft lenses of the invention are characterized by a combination of optimized properties such as high water content, high oxygen permeability, and good mechanical strength, e.g., tear strength, tensile strength, etc., whereas the dry or nearly dry cross-linked copolymer of the invention can be readily lathed, as indicated above, to a commercial contact lens.

The ratio of polymerized N,N-dialkylacrylamide to cyclohexyl methacrylate in the novel copolymer should be maintained between 3.5 to 5.5 mols of N,N-dialkylacrylamide per one mol of cyclohexyl methacrylate. Below 3.5:1 it was observed that the copolymer was milky whereas above 5.5:1 the copolymer was too soft. Thus, it was concluded from the experiments that within the stated range novel buttons could be lathed into novel contact lenses exhibiting the afore-illustrated desirable characteristics. These characteristics become even more pronounced when the mol ratio of N,N-dialkylacrylamide to cyclohexyl methacrylate is below about 4:1 to about 5:1. A mol ratio of about 4.5:1 appears to optimize the properties of the novel products.

The novel polymer should be cross-linked to render it water-swellable but water-insoluble. Cross-linking can be accomplished by means which are conventional in the art for cross-linking N,N-dialkylacrylamide polymers or hydroxyalkyl methacrylate polymers. Thus, for example, there can be used any of the methods or cross-linking agents set forth in the aforementioned Schultz and Wichterle patents. Cross-linking can be accomplished, for example, by the use of high energy radiation or by the use of a copolymerizable polyethylenically unsaturated monomer or by use of a combination of two or more of the methods of cross-linking. When a cross-linking monomer is employed, it usually is used in an amount of about 0.02 to 5% by weight, preferably about 0.1 to 2% by weight, of the total monomers. Examples of cross-linking monomer are multiesters, especially multiesters of acrylic and methacrylic acid. Examples of such multiesters include, for example, the glycol diacrylates and the glycol dimethacrylates such as ethylene glycol diacrylate or dimethacrylate, diethylene glycol diacrylate or dimethacrylate, triethylene glycol diacrylate or dimethacrylate, tetraethylene glycol diacrylate or dimethacrylate, 1,4-butylene glycol diacrylate or dimethacrylate and 1,3-butylene glycol diacrylate or dimethacrylate, and glycerine triacrylate or methacrylate.

Polymerization can be initiated in conventional fashion, e.g., by ultra-violet light or high-energy irradiation or by using radical initiators, e.g., diisopropyl peroxy dicarbonate, azo-bis-isobutyronitrile, benzoyl peroxide, sodium persulfate, etc., e.g., in an amount of 0.01 to 1% by weight of the total monomers. A preferred polymerization initiator is cobalt 60.

The monomers can be polymerized in bulk or in solution, e.g., in water or a water miscible solvent or mixtures thereof. The novel polymers, prepared via bulk polymerization techniques, when placed in water form hydrogels.

It is normally desirable to keep the polymerization temperature below about 40° C., preferably not over 10° C. in order to better control the polymerization reaction. Polymerization is preferably carried out at 4°–8° C. using cobalt 60 radiation.

A particularly preferred formulation in weight percent is the following:

N,N-dimethylacrylamide (DMA)=71.46%
cyclohexyl methacrylate (CHMA)=26.95%
tetraethylene glycol dimethacrylate (TEGDMA)=1.59%

The same formulation expressed in molar ratio is the following:

DMA/CHMA=4.5/1 (mole/mole)
TEGDMA 1.5% (volume percent of DMA and CHMA)

Polymerization of the above monomer mixture is activated by Co-60 gamma radiation at 4°–8° C. The resulting polymer rod is cut with an industrial band saw, into approximately 4 mm segments or optical buttons. The optical buttons are post-cured, annealed, lathe-cut into lenses, and subsequently equilibrated with 0.9% sodium chloride solution to form hydrophilic contact lenses. The polymer has a water content of approximately 69%, an oxygen permeability of $38.2 \times 10^{-10}$ ($cm^3$-cm/sec/$cm^2$-cmHg) and an initial tear strength of 2.7 g/mm, propagation tear strength of 2.0 g/m, linear expansion 45%, tensile strength 50.4 g/$mm^2$, burst strength 9 psi (0.12 mm), refractive index 1.509 (dry) and 1.386 (wet), no cytotoxicity and transparency above 97%. The novel soft contact lenses have a water content of at least about 60%, desirably from about 60% to 80%, and preferably from about 60% to 75%.

The following Examples are illustrative and are not to be construed as limiting the invention(s). Certain materials employed in these Examples as well as methods of evaluation are described below.

Water content of the hydrogel is expressed as follows:

Weight Percent $H_2O$ =

$$\frac{(\text{Hydrated Weight} - \text{Dried Weight}) \times 100\%}{\text{Hydrated Weight}}$$

Mechanical strength is expressed as a "tear strength" which is a method employed in evaluation of soft contact lenses. The hydrogel test sample (about 10 mm in length and about 5 mm in width) is split initially at its width. The split end is fastened to an instrument equipped with a transducer and a recorder. The sample is kept in water during this test. The pulling force needed to tear the sample along its whole length (at the split) is recorded (in grams) and normalized for 1 mm thickness.

Oxygen permeability method used is the standard procedure used to measure the oxygen permeability of hydrogels (Y. Yasuda and W. Stone, *J. of Polymer Sci.,* 4, 1314–1316 (1966)). A similar procedure can be used to measure the permeability of films (ASTM-Volume 27, D1344). Oxygen permeability of a hydrogel is primarily a function of the water content of the hydrogel. It can be either measured experimentally or interpolated from a graph constructed from values of oxygen permeability measured on hydrogel membranes of varying water content. The correlation of oxygen permeability values with hydrogels of 38, 58, 70 and 85 weight percent water content is shown in the Table below:

TABLE

| Weight % Water | Oxygen Permeability $\times 10^{-10(1)}$ |
|---|---|
| 38 (Hydron ®) | 10.0 |
| 58 (Duragel ®) | 23.3 |
| 70 (Duragel ®)[(2)] | 34.8 |
| 85 (Permalens ®)[(3)] | 42.8 |

(1) $\frac{cm^3 - cm}{sec - cm^2 - cmHg}$
(at standard pressure, 34° C.) using Delta Scientific Model 2110, Dissolved Oxygen BOD and Temperature Analyzer.
(2) Duragel is a trademark of
(3) Permalens is a registered trademark of Cooper Laboratories, Inc.

Unless otherwise indicated, all parts and percentages are by weight.

The composition can comprise, consist, essentially of, or consist of the stated materials.

EXAMPLE 1

The general procedure employed is as follows:
DMA (N,N-dimethylacrylamide) 71.46%
CHMA (cyclohexylmethacrylate) 26.95%
TEGDMA (tetraethylene glycol dimethacrylate) 1.59%

Preparation of Monomer Solution

Start with the given amount of DMA and slowly add the CHMA, stir constantly, add the TEGDMA to the DMA and CHMA mixture. Be prepared to use an ice-bath whenever the temperature of the mixture exceeds 40° C.

To prepare a monomer solution of approximately 2,000 g, which will produce roughly 2,000 optical buttons, the following amount of monomers can be used:
wt of DMA—71.46%×2,000 g=1429.2 g
wt of CHMA—26.95%×2,000 g=539.0 g
wt of TEGDMA—1.59%×2,000 g=31.8 g.

5 cc hypodermic syringes are used to contain the monomer solution during polymerization. The monomer solution is kept at a low temperature (4°–8° C.) during radiation to avoid popcorn polymerization produced by excessive heat from the exothermic reaction.

The polymerization is activated by Co-60 gamma radiation at 4°–8° C. The container is constantly rotating (approximately 1 rpm) during polymerization. The best results are obtained with a 1.0 M.R. (megarad) dose. The radiation period is approximately 60 minutes. After polymerization is completed, the temperature of the water is observed; 8°–10° C. is optimum with a 20° C. maximum.

The resulting polymer usually has an amber color. It is believed this is due to ionized particles; i.e., gases, oligomers, and polymers, trapped in the polymer matrix. The color will dissappear after post-curing annealing, and storage because the ionized particles tend to recombine into neutral particles, which are colorless.

The polymer rods, contained in the 5 cc syringes, are cut with an industrial band saw ($\frac{1}{4}$″ blade) into approximately 4 mm segments or buttons. A $\frac{1}{2}$ ton arbor press is used to remove the optical buttons from the 4 mm syringe segments.

Post-Curing and Annealing

During the post-curing process, the optical buttons are exposed to heat, slightly higher (minimum 10° C.) than the glass transition temperature (Tg) of the polymer, to increase the degree of polymerization. This, in turn, reduces any residual monomers and decreases the intensity of the amber color in the buttons. Immediately following the post-curing process, the buttons are annealed or slow cooled, at a rate of about 0.2° C./minute.

The optical buttons are arranged on a tray in a single layer and placed in an oven. A thermocouple, permanently attached to one of the buttons prepared in a previous batch, is placed in the oven to detect the button temperature. The oven is purged with nitrogen gas (1 cubic feet/hr.) during the post-curing process to remove oxygen in the oven. The flow of nitrogen is turned off during the annealing period to avoid rapid cooling. A Variac was used to control the cooling rate. However, a commercially available programmable oven is recommended for large scale production.

During post-curing, the optical buttons are heated to approximately 125° C. and are kept at this temperature for two and a half hours. The temperature (125° C.) is called post-curing temperature or soaking temperature. It is recommended that the soaking temperature does not exceed 130° C. in order to avoid discoloration or degradation of the polymer. The rate of heating is not critical in the post-curing period. After post-curing, the oven is slowly cooled down to 50° C. This is called the annealing process. The optimized cooling rate is 0.1°–0.3° C./minute.

Using the procedure just described with monomers, as indicated, there were obtained the results set forth in Table 1. The amount of DMA and CHMA are expressed in moles and the amount of TEGDMA in weight percent of total monomers. The water content is based on equilibration with 0.9% sodium chloride solution.

In the tear strength measurements, the abbreviation "I" stands for "Initial", i.e., the initial force required to tear the wet polymer specimen, and the abbreviation "P" stands for "Propagation", i.e., the continuing force required to propagate the tear until the specimen is torn into two pieces.

TABLE 1

| Formulation | | | Dose | $O_2$ Permeability | $H_2O$ Content (hydrated | Tear Strength $g/mm^2$ | | Tensile Strength | Young's Modulus | % Elonga- |
|---|---|---|---|---|---|---|---|---|---|---|
| DMA | CHMA | TEGDMA | (MR) | at 34° C. $\times 10^{-10}$ | polymer) | I | P | $g/mm^2$ | $g/mm^2$ | tion |
| 4.5 | 1.0 | 0.2 | 0.54 | | 74.9 | | | | | |
| 4.5 | 1.0 | 0.2 | 1.09 | | 69.7 | | | | | |
| 4.0 | 1.0 | 0.2 | 0.50 | | 75.7 | | | | | |
| 4.5 | 1.0 | 0.2 | 0.50 | | 77.5 | | | | | |
| 4.5 | 1.0 | 0.2 | 1.02 | | 77.1 | | | | | |
| 4.5 | 1.0 | 0.2 | 1.52 | | 76.8 | | | | | |
| 4.5 | 1.0 | 0.2 | 1.0 | 49.5 | | 5.8 | 4.1 | | | |
| 4.5 | 1.0 | 0.4 | 1.0 | 41.1 | | 3.8 | 2.4 | | | |
| 4.5 | 1.0 | 0.8 | 1.0 | 33.9 | | 3.9 | 2.2 | | | |
| 4.5 | 1.0 | 0.8 | 0.98 | 45.0 | | 3.8 | 2.12 | 48.11 | 28.13 | 153.3 |
| 4.5 | 1.0 | 0.6 | 1.14 | | | | | 38.29 | 11.78 | 237.3 |
| 4.5 | 1.0 | 1.0 | 1.09 | 38.5 | 71.7 | 3.4 | 2.6 | 63.27 | 21.33 | 217.3 |
| 4.5 | 1.0 | 1.2 | 1.09 | 39.4 | 70.0 | | | 40.18 | 30.42 | 122.7 |
| 4.5 | 1.0 | 1.5 | 1.09 | 40.8 | 61.3 | 1.6 | 1.2 | 50.42 | 14.65 | 248.0 |
| 4.5 | 1.0 | 2.0 | 1.09 | 32.2 | 60.0 | 2.0 | 1.3 | 60.72 | 37.62 | 134.7 |
| 5.5 | 1.0 | 0.8 | 1.09 | | 75.6 | | | | | |
| 5.5 | 1.0 | 1.0 | 1.09 | | 74.9 | | | | | |
| 5.5 | 1.0 | 1.2 | 1.09 | | 73.9 | | | | | |
| 5.5 | 1.0 | 1.5 | 1.09 | | 71.2 | | | | | |
| 5.5 | 1.0 | 2.0 | 1.09 | | 69.7 | | | | | |

EXAMPLE 2

Using the procedure of Example with 1 megarad of Co-60 radiation and with a mole ratio of N,N-dimethylacrylamide to cyclohexyl methacrylate of 4.5:1, the effect of cross-linking concentration on the $O_2$ transport rate, tensile strength, and tear strength were investigated. The results are shown in Table 2. These results based on data obtained are calculated for comparison with the commercial product SOFLENS ® (Bausch and Lomb trademark for polymacon contact lenses). The flexibility of SOFLENS ® (B3, 1.25 normalized to 0.1 mm center thickness) is 0.3 gram with a 0.75 mm compression. The properties of the high water content lens of the present invention with flexibility equivalent to that of SOFLENS ® (B3), i.e., 0.3 gram with 0.75 mm compression for the indicated weight percent of tetraethylene glycol dimethacrylate are as shown in Table 2

TABLE 2

| TEGDMA % | Flexibility (g) (0.75 mm Compression) | Center Thickness (mm) | $O_2$ Transport Rate ($cm^3$ — cm/sec — $cm^2$ — CmHg) $\times 10^{-10}$ | Tensile ($g/mm^2$) | Tear Strength | |
|---|---|---|---|---|---|---|
| | | | | | I(g/mm) | P(g/mm) |
| 0.8 | 0.3 | 0.17 | 37.0 | 48.1 | 3.8 | 2.2 |
| 1.0 | 0.3 | 0.14 | 40.7 | (41)* | 3.4 | 2.6 |
| 1.2 | 0.3 | 0.12 | 45.9 | 40.2 | 2.3 | 1.8 |
| 1.5 | 0.3 | 0.10 | 53.2 | 50.4 | 2.7 | 2.0 |
| 2.0 | 0.3 | 0.08 | 56.4 | 60.7 | 2.0 | 1.3 |

*Figure in parenthesis is estimated value.
Conclusion:
Based on the theoretically calculated data shown in the table, the formula 4.5/1.0/1.5 seems to offer the optimal combination of properties.

The DMA, CHMA, TEGDMA terpolymer of the invention is hydrolytically stable. A lens was heated in saline solution at 100° C. for longer than 148 hours. No significant charge of transparency and refractive index and no discoloration were observed.

It is critical to use cyclohexyl methacrylate in forming the copolymer. Thus, for example, when there was employed n-hexyl methacrylate in the formula dimethyl acrylamide: 4.5 moles
n-hexyl methacrylate: 1 mole
tetraethylene glycol: 1.5 weight % and the composition was polymerized using about 1 megarad of Co 60 irradiation and buttons formed from the polymer, it was not possible to lathe satisfactory contact lenses because the polymer was too soft and easily distorted by a fairly low temperature, e.g., 180° F. (about 82° C.).

The new copolymers have a well-balanced combination of properties, including good machinability, excellent tear strength, good burst strength, and high oxygen permeabilities which make them valuable for use in making soft contact lenses.

What is claimed is:

1. A cross-linked copolymer of N,N-($C_1$-$C_2$alkyl)acrylamide and cyclohexyl methacrylate having a molar ratio of 3.5 to 5.5:1.

2. A copolymer according to claim 1 having a molar ratio of about 4.0 to 5:1.

3. A copolymer according to claim 2 having a molar ratio of 4.5:1.

4. A copolymer according to claim 2 wherein the acrylamide is N,N-dimethylacrylamide.

5. A copolymer according to claim 3 wherein the acrylamide is N,N-dimethylacrylamide.

6. A copolymer according to claim 1 including 0.02 to 5 weight % of the total monomers of a cross-linking monomer.

7. A copolymer according to claim 6 wherein the cross-linking agent is a multiester of acrylic acid or methacrylic acid.

8. A copolymer according to claim 7 wherein the molar ratio of the N,N-($C_1$-$C_2$alkyl)acrylamide to cyclohexyl methacrylate is about 4.0 to 5:1 and wherein the copolymer includes from about 0.1 to 2.0 weight % of the crosslinking agent.

9. A copolymer according to claim 8 of N,N-dimethylacrylamide to cyclohexyl methacrylate of 4.5:1 and a weight percent of tetraethylene glycol dimethacrylate of 1.5 based on the total monomers.

10. A water-swellable, water-insoluble hydrophilic contact lens formed from a cross-linked copolymer of N,N-($C_1$-$C_2$alkyl)acrylamide and cyclohexyl methacrylate having a molar ratio of 3.5 to 5.5:1.

11. A contact lens according to claim 10 made from a copolymer having a molar ratio of about 4.0 to 5:1.

12. A contact lens according to claim 11 made from a copolymer having molar ratio of 4.5:1.

13. A contact lens according to claim 12 wherein the acrylamide is N,N-dimethylacrylamide.

14. A contact lens according to claim 11 wherein the acrylamide is N,N-dimethylacrylamide.

15. A contact lens according to claim 10 from a copolymer including 0.02 to 5 weight % of the total monomers of a cross-linking monomer.

16. A contact lens according to claim 15 wherein the cross-linking agent is a multiester of acrylic acid or methacrylic acid.

17. A contact lens according to claim 16 wherein the acrylamide is N,N-dimethylacrylamide and wherein the copolymer includes from about 0.1 to 2.0 weight % of the cross-linking agent.

18. A contact lens according to claim 17 wherein the cross-linking agent is a polyalkylene glycol diacrylate or dimethacrylate.

19. A contact lens according to claim 18 wherein the copolymer is a copolymer of N,N-dimethylacrylamide to cyclohexyl methacrylate of 4.5:1 and a weight percent of tetraethylene glycol dimethacrylate of 1.5 based on the total monomers.

20. A contact lens according to claim 19 wherein the copolymer is prepared by polymerization with about 1 megarad of gamma irradiation.

21. A contact lens according to claim 19 having an oxygen permeability of about $38.2 \times 10^{-10}$ $cm^3$-cm/sec-$cm^2$-cmHg and when equilibrated with 0.9% sodium chloride solution having a water content of about 69%.

22. A contact lens according to claim 21 having an initial tear strength of 2.7 g/mm.

23. A contact lens according to claim 13 made from a copolymer of N,N-dimethylacrylamide, cyclohexyl methacrylate, and from about 0.1 to 2.0 weight % of a polyethylene glycol diacrylate or dimethacrylate, said lens having an oxygen permeability of about 32 to $40 \times 10^{-10}$ $cm^3$-cm/sec-$cm^2$-cmHg.

24. A contact lens according to claim 23 which when equilibrated with 0.9% sodium chloride solution has a water content of about 60 to 75%.

25. A contact lens according to claim 24 wherein the cross-linking agent is tetraethylene glycol dimethacrylate.

26. A contact lens according to claim 24 containing about 60 to 75% water.

* * * * *